Patented Apr. 10, 1934

1,954,650

UNITED STATES PATENT OFFICE 1,954,650

METHOD OF REMOVING THE SHELLS OF CASHEW NUTS

William F. Schaufelberger, Maplewood, N. J., assignor, by mesne assignments, to The Harvel Corporation, a corporation of New Jersey No Drawing. Application April 6, 1931, Serial No. 528,247

7 Claims. (Cl. 146—219)

The present invention relates to methods and steps for removing the shells from the kernels of cashew nuts and marking nuts; and the invention relates further to methods and steps for removing the shell oil of these nuts from the shell.

The cashew nut and the marking nut, both members of the Anacardium group of the family Anacardiaceæ, have an edible kernel about which there is a double walled shell, with a cellular space between said walls and a liquid in the shells of said space. This liquid is used to a considerable and constantly growing extent in the manufacture of paints, lacquers, varnishes, electrical insulation and for many other materials and purposes. The said double wall of these shells is of a tough horn-like consistency which renders the shell difficult of breaking open unless such force is used that the kernels are broken to small pieces unsuited for use. At the present time the shell liquid is removed by charring the shells, breaking open the charred shells by hand and separating therefrom the kernels, and collecting the liquid which drips from the broken shells. This method of handling the nuts results in an oil which is contaminated by a considerable quantity of carbon from the charred portions of the shell, and this contamination reduces the value or increases the cost of handling and preparation of the shell liquid for practical use.

The kernels of these nuts also are valuable, particularly for edible purposes, and are used in quite large quantities in this country and abroad.

It is an object of the present invention to provide method for removing the shells of cashew nuts and marking nuts with a minimum breakage of the kernels thereof.

It is a further object of the present invention to provide method for removing the shell liquid without contamination thereof and with regard to securing an optimum proportion of whole kernels.

Other objects and advantages of the present invention will be apparent from the following description of the methods thereof and from the appended claims.

I have discovered that the double walled shell of nuts of the Anacardium group, particularly the marking nut and the cashew nut, can be easily removed from the kernel with a minimum of kernel breakage by bringing the temperature of the nuts to a low point at which the liquid in the cellular spaces of the double walled shell congeals and then cracking the shell of the nut while the oil is in that state. During the congealed state the shell liquid is hard and solid, particularly at temperatures of about 32° F. and below. There is also an apparent expansion which separates the inner wall of the shell from the kernel. The general character and edibility of the kernel and the oil contained therein is not deteriorated by subjection to the low temperature at which the oil is sufficiently congealed or solidified for cracking the shell and I have solidified the shell liquid by placing the nuts in direct contact with solid carbon dioxide in a closed and heat insulated space.

According to the preferred form of the present invention the shells of these nuts with the shell liquid solidified therein is removed from the kernel before it becomes liquid again because the shells, being brittle in this state, are more easily removed from the kernel and also because this removal can be done without getting the shell liquid on the kernels. The cracked shells can be removed from the kernels either by hand, or by hand operated or automatic machinery.

However, the invention extends also to the removal of the shell from the kernels after the shells have been cracked while the shell liquid is congealed therein but after the shell liquid has melted. This is of advantage where the cracked shells are removed from the kernels by hand or machinery and where maintenance of reduced temperature is not desired.

Further, according to the present invention, the oil is removed from the shells by pressing, by centrifugal force as in well known centrifuges, and by other means, and the shells can be further broken up after removing from the kernel by cracking them up into pieces of size suitable to get maximum quantity of liquid therefrom without having an excess of pieces of such fineness as to make it difficult to separate them from the shell liquid, while the shell liquid is congealed by the use of low temperatures either before the liquid has melted or after the first solidification or by again reducing to low temperature and congealing the liquid.

Having thus described my invention what I claim is—

1. The method of removing the shells from the kernels of cashew nuts and marking nuts which comprises bringing the temperature of the nuts to a low point at which the liquid of the shell congeals, cracking the shell at this temperature, and then removing the shell from the kernel.

2. The method of removing the shells from the kernels of cashew nuts and marking nuts which comprises bringing the temperature of the nuts to a low point at which the liquid of the shell congeals, cracking the shell at this temperature, and then removing the shell from the kernel while the shell liquid is congealed.

3. The method of removing the shell from the kernel of the cashew nut which comprises cracking the shell while the liquid of the shell is congealed at a low temperature, and removing the shell from the kernel.

4. The method of removing the shell from the kernel of the cashew nut which comprises cracking the shell while the liquid of the shell is congealed at a low temperature, and removing the shell from the kernel while said liquid is congealed.

5. In removing the shell from the kernel of the cashew nut the step which comprises cracking the shell while the liquid of the shell is congealed at a low temperature.

6. The method of removing the shell from the kernel of the cashew nut which comprises congealing the liquid of the shell by reducing the temperature thereof to a range extending from about 32° F. downwardly, cracking the shell while the liquid thereof is so congealed, and removing the shell from the kernel.

7. The method which comprises removing the shell from the kernel of the cashew nut by cracking said shell at a reduced temperature at which the shell liquid is congealed, removing the shell from the kernel, melting the congealed liquid, and removing the liquid from the shell.

WILLIAM F. SCHAUFELBERGER.